United States Patent [19]
Hines

[11] Patent Number: 5,775,092
[45] Date of Patent: Jul. 7, 1998

[54] VARIABLE SIZE GAS TURBINE ENGINE

[75] Inventor: William R. Hines, Cincinnati, Ohio

[73] Assignee: General Electric Company, Cincinnati, Ohio

[21] Appl. No.: 851,869

[22] Filed: May 6, 1997

Related U.S. Application Data

[63] Continuation of Ser. No. 561,669, Nov. 22, 1995, abandoned.

[51] Int. Cl.$^6$ .................................................. F02D 3/13
[52] U.S. Cl. ................................. 60/39.161; 60/726
[58] Field of Search ........................ 60/39.161, 39.25, 60/226.3, 262, 269, 726

[56] References Cited

U.S. PATENT DOCUMENTS

| | | | |
|---|---|---|---|
| 2,322,987 | 6/1943 | West | 60/39.27 |
| 2,390,959 | 12/1945 | Pfenninger | |
| 2,457,594 | 12/1948 | Nettel et al. | 60/39.07 |
| 2,748,566 | 6/1956 | Fletcher | 60/39.161 |
| 3,224,195 | 12/1965 | Walsh | |
| 3,527,053 | 9/1970 | Horn | |
| 3,548,597 | 12/1970 | Etassam | |
| 3,854,286 | 12/1974 | Klees | |
| 3,858,390 | 1/1975 | Jansen et al. | 60/39.25 |
| 3,859,785 | 1/1975 | Leto et al. | |
| 3,979,903 | 9/1976 | Hull, Jr. et al. | |
| 4,052,845 | 10/1977 | Tumavicus | |
| 4,055,946 | 11/1977 | Sens | |
| 4,068,471 | 1/1978 | Simmons | |
| 4,803,837 | 2/1989 | Simmons | |
| 4,958,489 | 9/1990 | Simmons | |
| 5,123,240 | 6/1992 | Frost et al. | |
| 5,174,105 | 12/1992 | Hines | |
| 5,279,109 | 1/1994 | Liu et al. | |
| 5,281,087 | 1/1994 | Hines | |
| 5,301,500 | 4/1994 | Hines | |
| 5,517,817 | 5/1996 | Hines | |

Primary Examiner—Louis J. Casaregola
Attorney, Agent, or Firm—Andrew C. Hess; Wayne O. Traynham

[57] ABSTRACT

A simple cycle gas turbine engine which includes a variable flow booster, a small high pressure compressor, and a power turbine is described. The variable flow booster, which includes a low pressure compressor, has at least two flow paths. In one embodiment, variable bleed valves, or doors, are used to control air flow through respective booster flow paths. In one embodiment, a first flow path directs air flow around booster compressor to the core engine, and a second flow path directs air flow at least partially through the booster compressor.

17 Claims, 8 Drawing Sheets

VARIABLE SIZE GAS TURBINE ENGINE this application is a Continuation of application Ser. No. 08/561,669 filed Nov. 22, 1995 abandoned.

FIELD OF THE INVENTION

This invention relates generally to gas turbine engines and more particularly, to variable size simple cycle gas turbine engines for marine applications.

BACKGROUND OF THE INVENTION

Gas turbine engines generally include a high pressure compressor for compressing air flowing through the engine, a combustor in which fuel is mixed with the compressed air and ignited to form a high energy gas stream, and a turbine. Such gas turbine engines also may include a low pressure compressor, or booster, for supplying compressed air, for further compression, to the high pressure compressor.

Gas turbine engines are used in many applications, including in aircraft and in ships. The desired engine operating characteristics vary, of course, from application to application. For example, in some marine applications, the engine operates at maximum horsepower for only short periods of time. The engine operates primarily at lower horsepower. More particularly, in one known marine application, the ship requires a maximum shaft horsepower (SHP) capability up to 29000 SHP for short periods of time, but the ship average mission fuel burned centers around 7500 SHP. The ship operates at 3000 SHP for significant time periods.

In the above described marine application, and in addition to satisfying maximum SHP requirements, it also is important that the engine operate efficiently over a broad range of SHP. Such efficiency typically is determined based on specific fuel consumption (SFC). More particularly, on a graph having SFC versus SHP, it is desirable that the curve be relatively flat over a broad range of SHP.

Known intercooled regenerative engines provide such a flat SFC versus SHP characteristic. Such intercooled regenerative engines, however, are very costly, require a large space, and are heavy. Especially in marine applications, such characteristics are highly undesirable.

It is desirable, of course, to avoid power turbine efficiency decreases at low powers while still maintaining maximum SHP capability. In addition, it is desirable to provide such an engine which is less costly, smaller, and lighter than known intercooled regenerative engines.

SUMMARY OF THE INVENTION

These and other objects may be attained by a simple cycle gas turbine engine which includes a variable flow booster, a small high pressure compressor, and a power turbine. The variable flow booster, which includes a low pressure compressor, has at least two flow paths. In one embodiment, variable bleed valves, or doors, are used to control air flow through respective booster flow paths.

More particularly, in one form, a bypass flow path and a compression flow path through the booster are provided. For lower SHP operation, the doors enable air to flow through the bypass flow path. In higher SHP operation, the doors enable air to flow through the operative portion, or low pressure compressor, of the booster.

With respect to the high pressure compressor, and in one specific embodiment, such compressor is selected to be most efficient for the average mission fuel burned SHP. For the marine application described above, for example, the high pressure compressor also is selected to be at design point efficiencies over a range of 9600–31170 SHP. The power turbine, in the one embodiment, is selected for design point operation at 16000 SHP so that the maximum required SHP, i.e., 31170 SHP, with two or three stages of variable vanes, can be delivered. The power turbine is operable over a range of 0–31170 SHP.

The above described engine, in operation, maintains the core high pressure turbine rotor inlet temperature, sometimes referred to as T41, and the compressor discharge pressure, sometimes referred to as P3, elevated even at low SHP. By maintaining T41 and P3 high even at low SHP, improved SFC over a broad range of SHP is achieved. In addition to achieving the desired efficiency, by using a small high pressure compressor, the engine is relatively less costly, smaller, and lighter than known intercooled regenerative engines.

Brief Description of the Drawings FIG. 1 is a schematic cross-sectional view of a simple cycle gas turbine engine in accordance with one embodiment of the present invention.

DETAILED DESCRIPTION OF THE DRAWINGS

Figure 1:
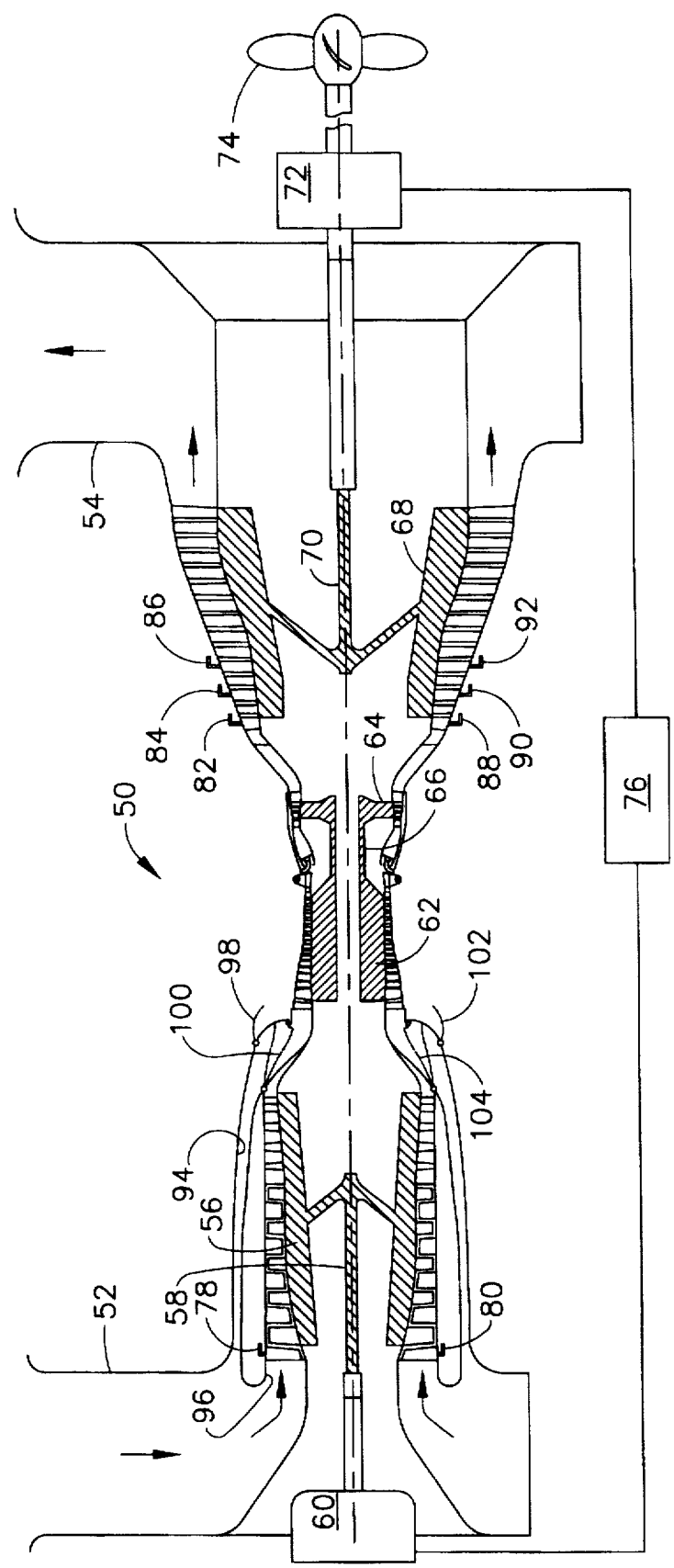

FIG. 1 is a schematic cross-section illustration of a gas turbine engine 50 in accordance with one embodiment of the present invention. Engine 50 includes an air intake nozzle 52 and an exhaust nozzle 54. A low pressure compressor 56 of a booster is coupled to a booster shaft 58 driven by a booster motor 60. A high pressure compressor 62 is located at the outlet of the booster compressor 56.

A high pressure turbine 64 is located at the output of compressor 62. Compressor 62 and high pressure turbine 64 are coupled to a high pressure (HP) shaft 66. Compressor 62 and turbine 64 are sometimes referred to as the core engine.

A low pressure turbine 68 is located at the outlet of high pressure turbine 64. Low pressure turbine 68 is coupled to a turbine shaft 70. Shaft 70 is coupled to, and drives, a generator 72 and a propeller 74. Generator 72 is electrically coupled to booster motor 60, via an electric power conversion unit 76, and supplies energy thereto as described hereinafter in more detail.

Variable inlet guide vanes (VIGVs) 78 and 80 are positioned at the inlet to booster compressor 56. VIGVs 78 and 80 are operated, as hereinafter described in more detail, to optimize SFC efficiency of engine 50. Variable area turbine nozzles (VATNs) 82, 84, 86, 88, 90 and 92 are positioned to control air flow through low pressure turbine 68. VATNs 82, 84, 86, 88, 90 and 92 also are operable, as hereinafter described in more detail, to optimize SFC efficiency operation of engine 50.

With respect to the booster, a first air flow path 94 and a second air flow path 96 are provided. Variable bleed valves (VBVs) 98, 100, 102, and 104 are used to control airflow through paths 94 and 96. VBVs 100 and 104 may be selectively positioned in one of three alternative positions, as illustrated in FIG. 1.

Figure 2:
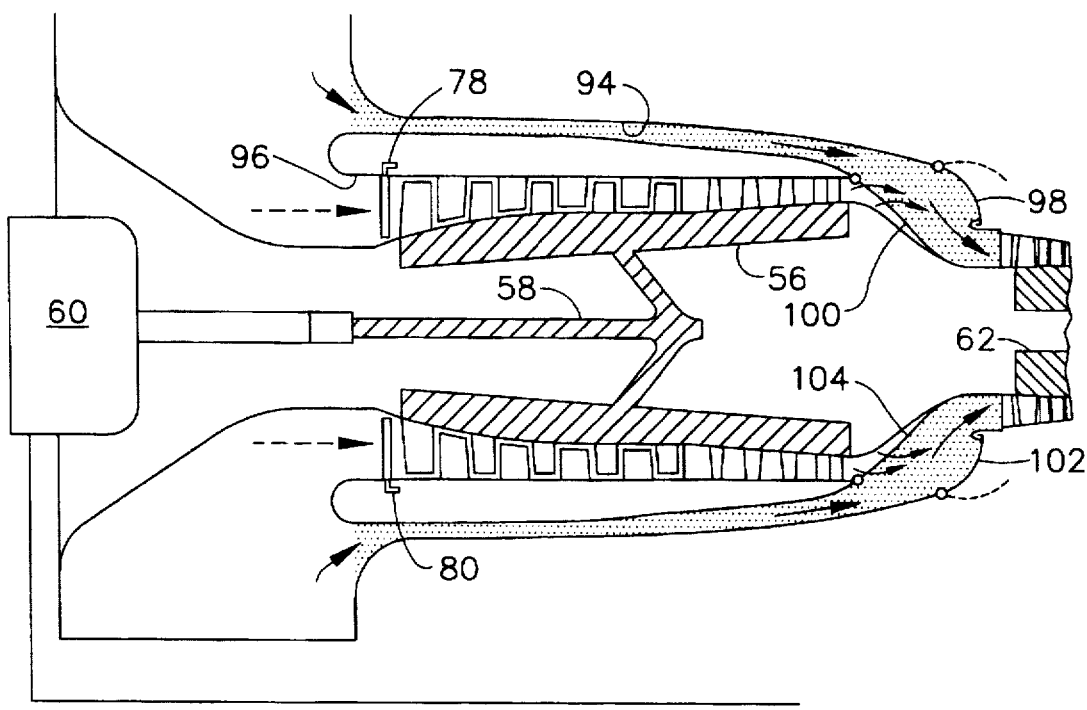
FIG. 2 illustrates air flow through a first air flow path of the engine booster shown in FIG. 1.

More particularly, and referring to FIG. 2, air flow through first air flow path 94 of the booster bypass is illustrated. When air flows through first air flow path 94, such operation is sometimes referred to as the bypass mode of booster operation. To establish air flow through first air flow path 94, doors 98, 100, 102 and 104 are positioned, i.e., closed, as shown in FIG. 2. Also, VIGVs 78 an 80 are substantially closed. In the bypass mode, electric motor 60 does not rotate booster shaft 58. Also, no air is pressurized by compressor 56. In one specific embodiment, and in the bypass mode of operation, air flows through first air flow path 94 at a rate of about between 0–50 lbs./sec., and the engine SHP under such conditions is 0–9603 SHP.

Figure 3:
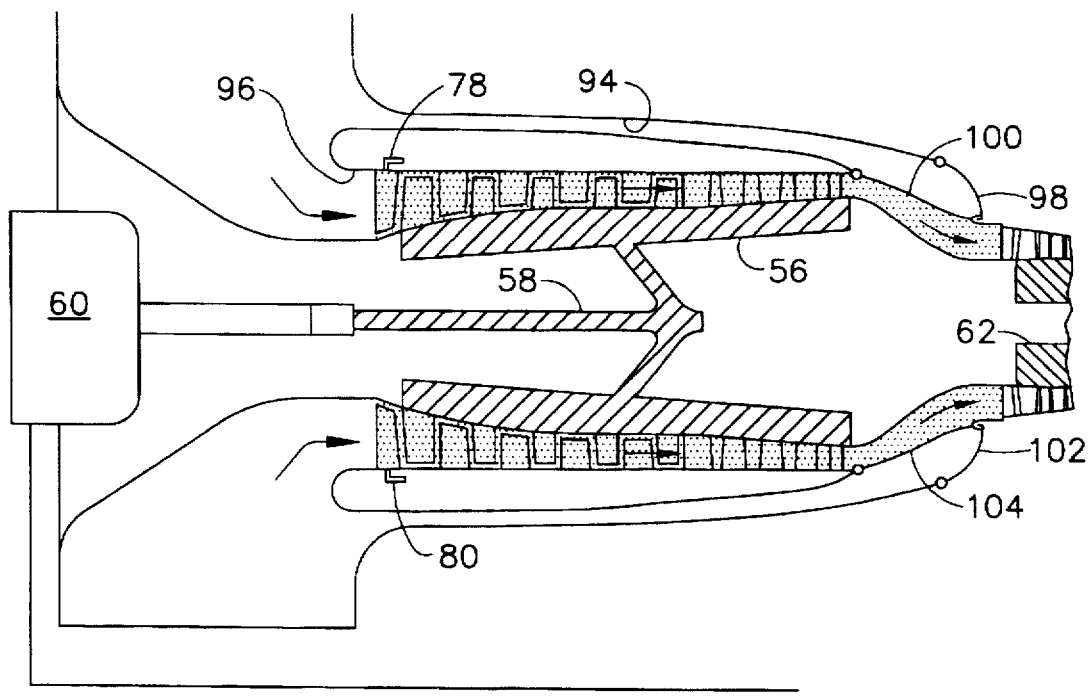
FIG. 3 illustrates air flow through a second flow path of the engine booster shown in FIG. 1.

FIG. 3 illustrates air flow through second air flow path 96 of the booster. More specifically, in this mode of operation, doors 98, 100, 102 and 104 are positioned as shown in FIG. 3. That is, doors 98 and 102 are closed and doors 100 and 104 are open. Motor 60 supplies approximately about 9460 hp to rotate shaft 58, and VIGVs 78 and 80 are substantially open to enable air flow through path 96. In this mode of operation and in one specific embodiment, air flows through second air flow path 96 at a rate of 50–120 lbs./sec. This mode of operation sometimes is referred to as the booster compressor mode of operation and the engine SHP under such conditions is 9603–31170 SHP.

Figure 4:
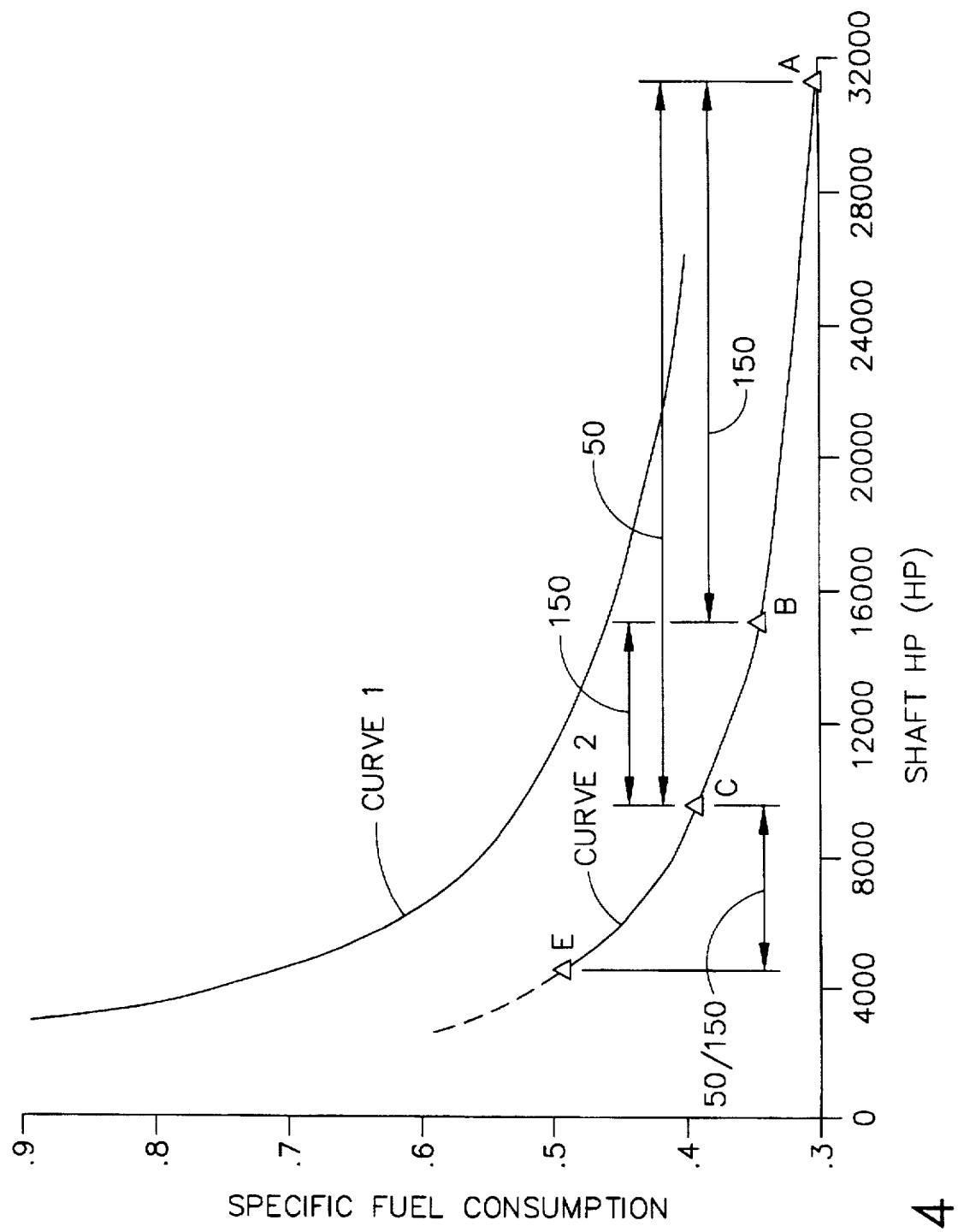
FIG. 4 is a graph illustrating calculated specific fuel consumption versus shaft horse power for a known engine and engines constructed in accordance with various embodiments of the present invention.

FIG. 4 is a chart illustrating calculated specific fuel consumption (SFC) versus shaft horsepower (SHP) for a known gas turbine engine and for engine 50. Specifically, curve 1 is the calculated SFC vs. SHP performance curve for a known engine. Curve 2 is the calculated SFC vs. SHP performance curve for engine 50. On curve 2, the curve section between points E (and below) and C represents SFC for the bypass mode of operation, and the curve section between points C and A represents SFC for the compressor mode of operation.

VATNs 188, 190, 192, 194, 196 and 198 are used to progressively close down the power turbine flow function as power is reduced so that at 4515 SHP, such VATNs are closed to –24%. Such a construction provides improved low power SFC.

Figure 5:
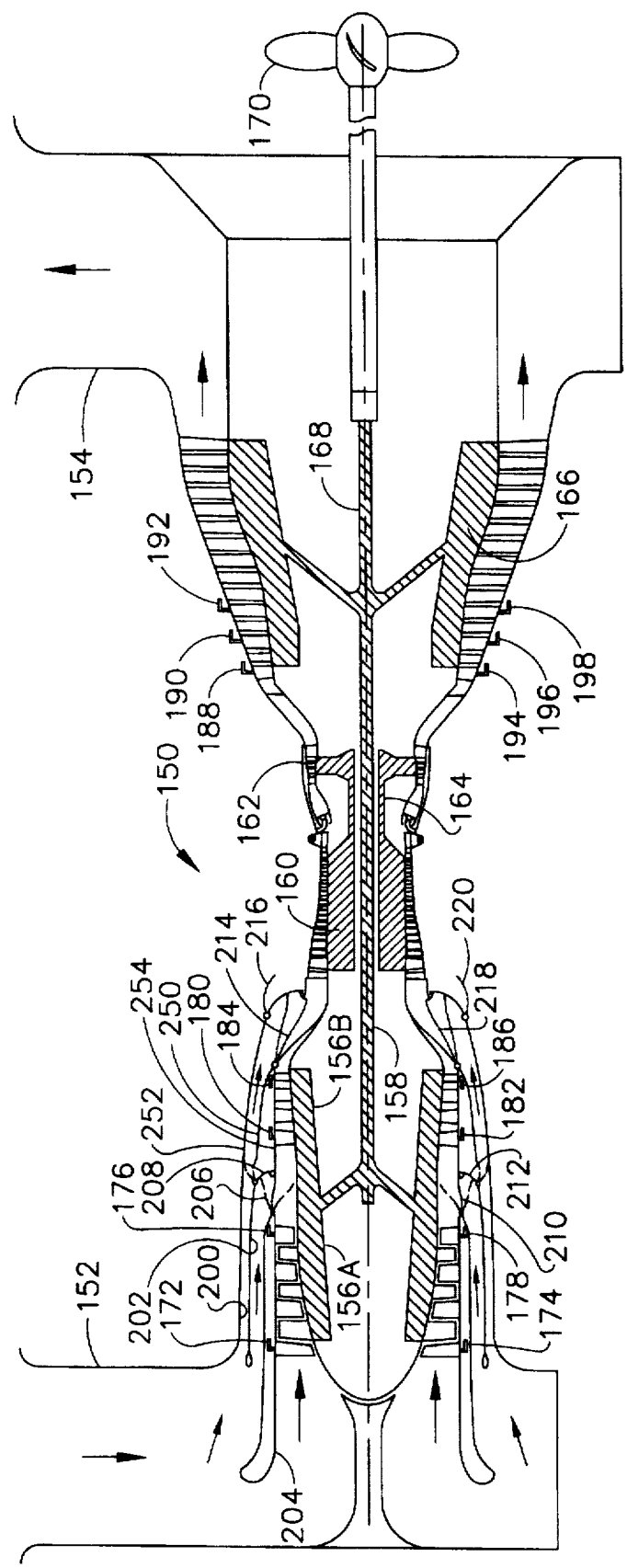
FIG. 5 is a schematic cross-section side view of an engine in accordance with another embodiment of the present invention.

FIG. 5 is a schematic cross-section illustration of a gas turbine engine 150 in accordance with another embodiment of the present invention. Engine 150 includes an air intake nozzle 152 and an exhaust nozzle 154. A first stage 156A and a second stage 156B of a low pressure compressor are coupled to a booster shaft 158 which is concentric and runs through the core engine and is connected to a power turbine, as described below. A high pressure compressor 160 is located at the outlet of booster second stage 156B. A high pressure turbine 162 is located at the output of compressor 160. Compressor 160 and high pressure turbine 162 are coupled to a high pressure (HP) shaft 164. A low pressure turbine 166 is located at the outlet of high pressure turbine 162. Low pressure turbine 166 is coupled to a turbine shaft portion 168 of shaft 158. Shaft portion 168 is coupled to, and drives, a propeller 170.

Variable inlet guide vanes (VIGVs) 172 and 174 and variable outlet guide vanes (VOGVs) 176 and 178 are operatively positioned to control air flow through first booster stage 156A. VIGVs 180 and 1182 and VOGVs 184 and 186 are operatively positioned to control air flow through second booster stage 156B. Variable vanes 172, 174, 176, 178 180, 182, 184 and 186 are operated, as hereinafter described in more detail, to optimize SFC efficiency of engine 150.

Variable area turbine nozzles (VATNs) 188, 190, 192, 194, 196, and 198 are positioned to control air flow through low pressure turbine 166. VATNs 188, 190, 192, 194, 196, and 198 also are operable, as hereinafter described in more detail, to optimize SFC efficiency operation of engine 150.

A first air flow path 200, a second air flow path 202 and a third air flow path 204 are provided with respect to booster stages 156A and 156B. First air flow path 200 completely bypasses both booster stages 156A and 156B. Second air flow path 202 bypasses first booster stage 156A and directs air through second booster stage 156B so that in second path 202, the air is pressurized by second booster stage 156B. Third air flow path 204 directs air through both first and second booster stages 156A and 156B so that air is pressurized by both first and second booster stages 156A and 156B. Variable bleed valves (VBVs) 206, 208, 210, 212, 214, 216, 218 and 220 are used to control airflow through paths 200, 202 and 204.

Figure 6:
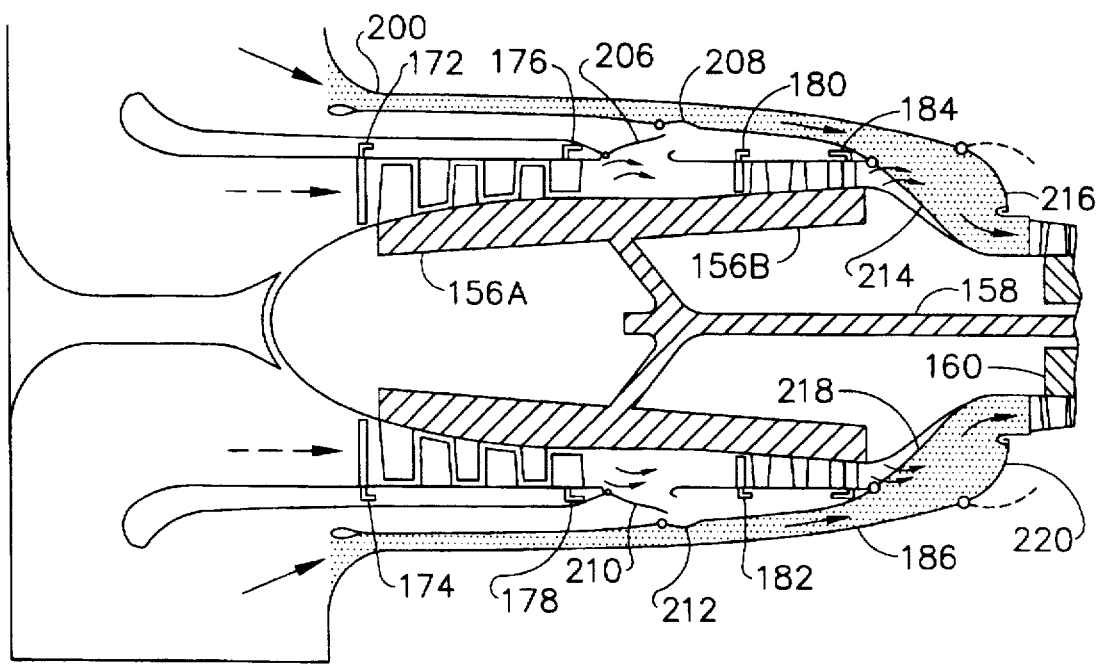
FIG. 6 illustrates air flow through a first air flow path of the engine booster shown in FIG. 5.

More particularly, and referring to FIG. 6, air flow through first air flow path 200 is illustrated. When air flows through first air flow path 200, such operation is sometimes referred to as the bypass mode. To establish air flow through first air flow path 200, doors 208 and 212 are substantially open and doors 214, 216, 218 and 220 are substantially closed. Also, VIGVs 172, 174, 180 and 182 are substantially closed. VOGVs 176, 178, 184 and 186 are aligned with a small amount of purge flow. Therefore, only purge air is pressurized by first and second booster stages 156A and 156B. In the bypass mode of operation, and in one specific embodiment, air flows through first air flow path 200 at a rate of 0–50 lbs./sec. and the engine SHP under such conditions is 0–9603 SHP, illustrated as the curve section between points E (and below) and C in FIG. 4.

Figure 7:
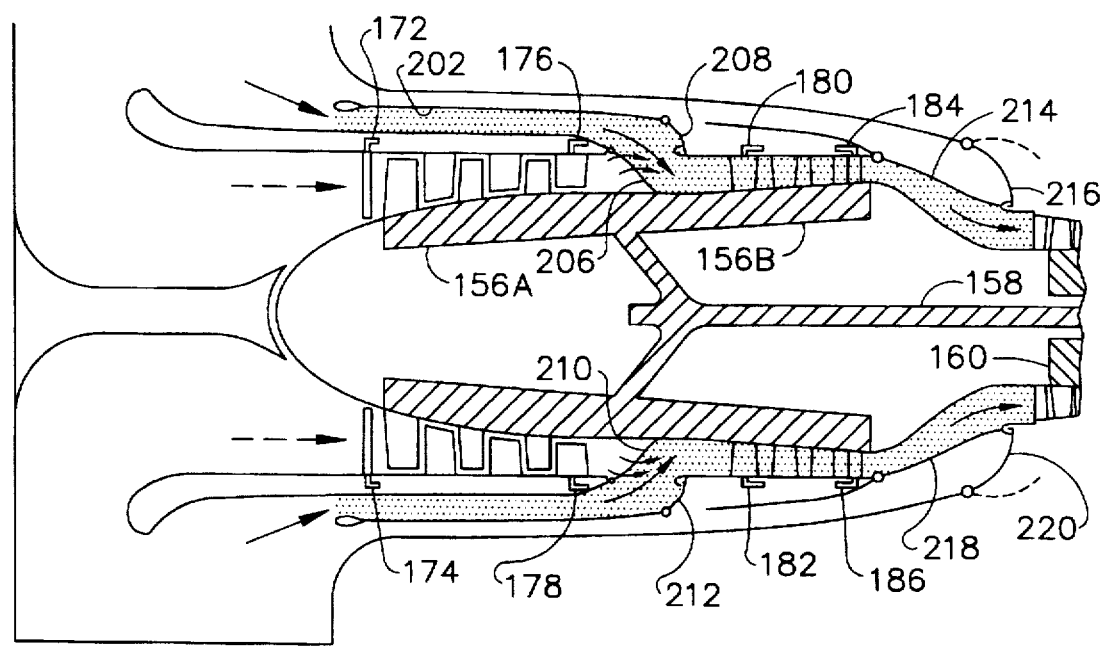
FIG. 7 illustrates air flow through a second flow path of the engine booster shown in FIG. 5.

FIG. 7 illustrates air flow through second air flow path 202. More specifically, in this partial bypass mode of operation, doors 206, 208, 210, 212, 216 and 220 are substantially closed while doors 214 and 218 are open. VIGVs 180 and 182 are substantially open to enable air flow through path 202. VOGVs 184 and 186 are used to guide the exit flow efficiently. VIGVs 172 and 174 are substantially closed while VOGVs 176 and 178 are aligned with the purge flow. In the partial bypass mode of operation, and in one specific embodiment, air flows through second air flow path 202 at a rate of 50–74 lbs./sec. and the engine SHP under such conditions is 9603–14926 SHP, illustrated as the curve section between points C and B in FIG. 4.

Figure 8:
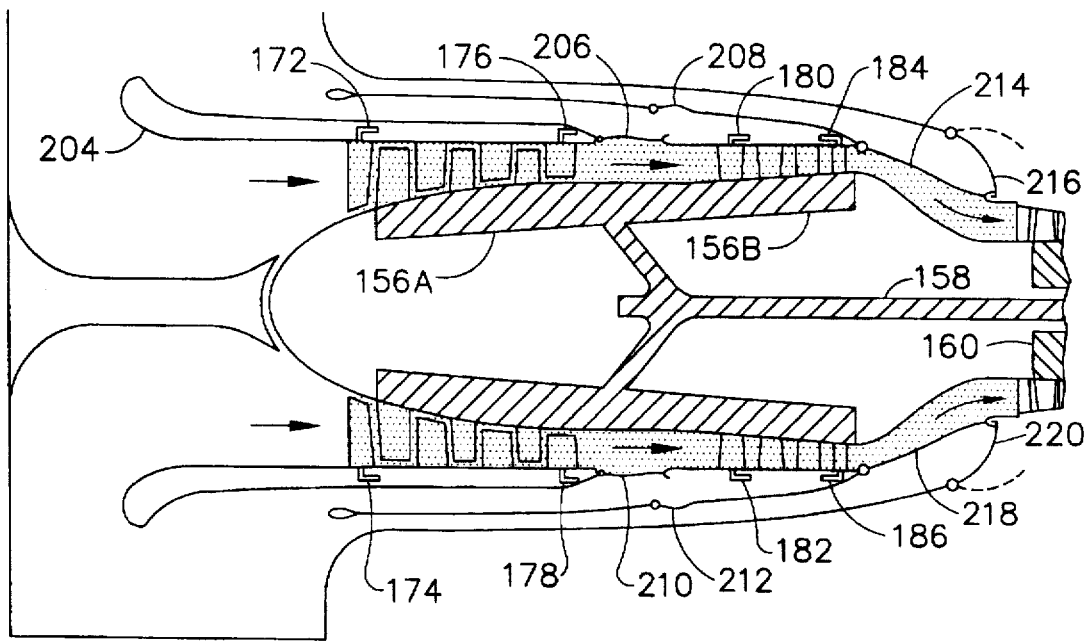
FIG. 8 illustrates air flow through a third flow path of the engine booster shown in FIG. 5.

FIG. 8 illustrates air flow through third air flow path 204. More specifically, in this full compression mode of operation, doors 216 and 220 are substantially closed and doors 206, 208, 210, 212, 214, and 218 are substantially open. VIGVs 172, 174, 176, 178, 180, 182, 184, and 186 are substantially open to enable air flow through path 204. In the full compression mode of operation, and in one specific embodiment, air flows through third air flow path 204 at a rate of 74–120 lbs./sec. and the engine SHP under such conditions is 14926–31170 SHP, illustrated as the curve section between points B and A in FIG. 4.

Figure 9:
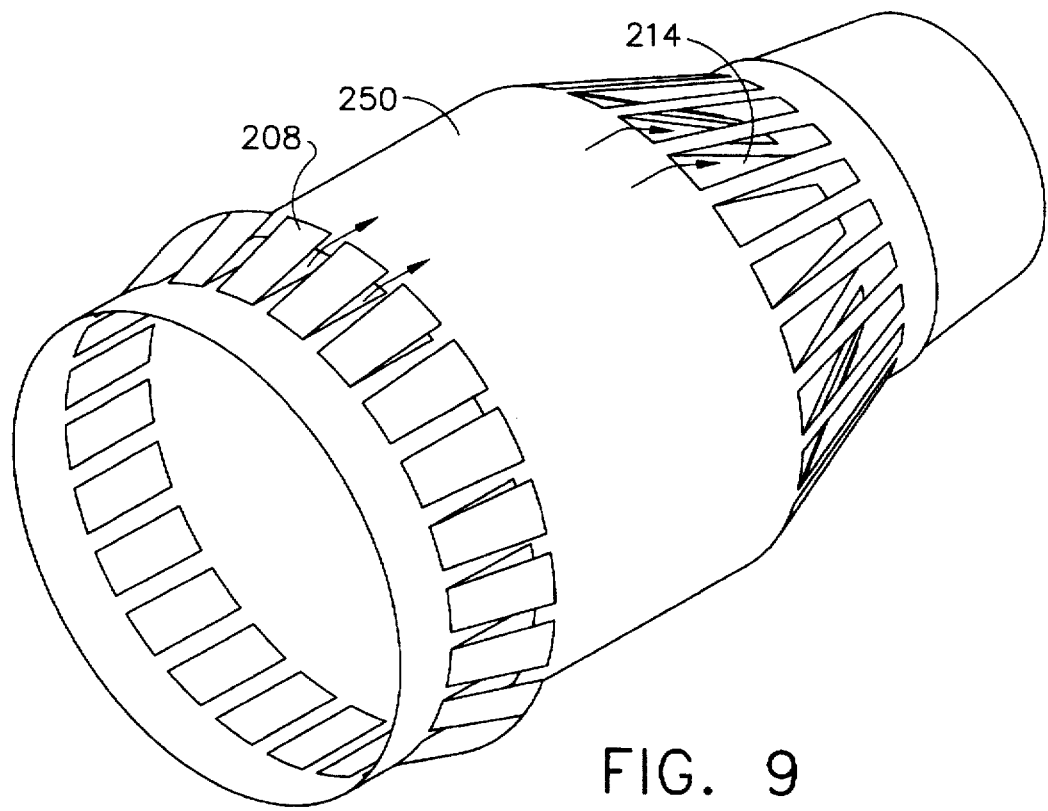
FIG. 9 is a perspective view of a shell including doors which control air flow through the engine booster of the engine shown in FIG. 5.

To further illustrate one configuration for the doors which control air flow, FIG. 9 is a perspective view of one embodiment of a shell 250 having VBVs, or doors, 208 and 214 integrally formed therewith. Shell 250 would, for example, be mounted between the outer shell 252 and inner shell 254 of the boosters (FIG. 5). Shell 250 has an aerodynamic shape to avoid separation. Doors 206, 208 and 214 are illustrated as being positioned to cause air flow through first air flow path 200 as shown in FIG. 6.

Figure 10:
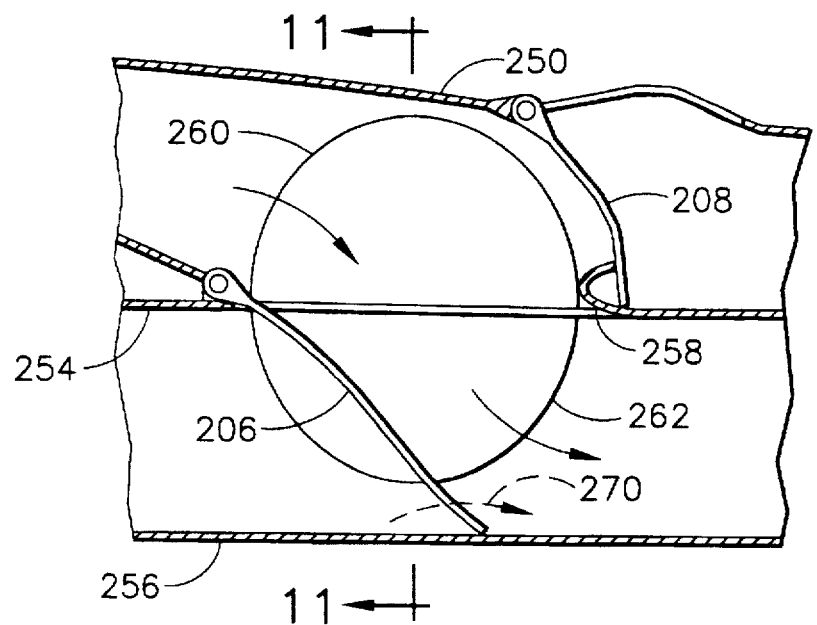
FIG. 10 is an exploded cross-sectional view of the doors used to control air flow.

FIG. 10 is a cross sectional view which illustrates booster doors 206 and 208 as shown in FIG. 7. Door 206 extends between booster bore wall 256 and inner shell 254. Door 208 extends from shell 250 to a stop 258 formed on inner shell 254. A first splitter 260 and a second splitter 262 are positioned in respective air flow paths. Doors 206 and 208 are shown positioned in FIG. 10 for air flow through second air flow path 202 (FIG. 7). As shown in FIG. 10, purge air 270 from third air flow path 204 which leaks between doors 206 (see FIG. 11) may cause doors 206 to move upwards by some small amount. The main air flow, however, is through air flow path 202 as shown in FIG. 7.

Figure 11:
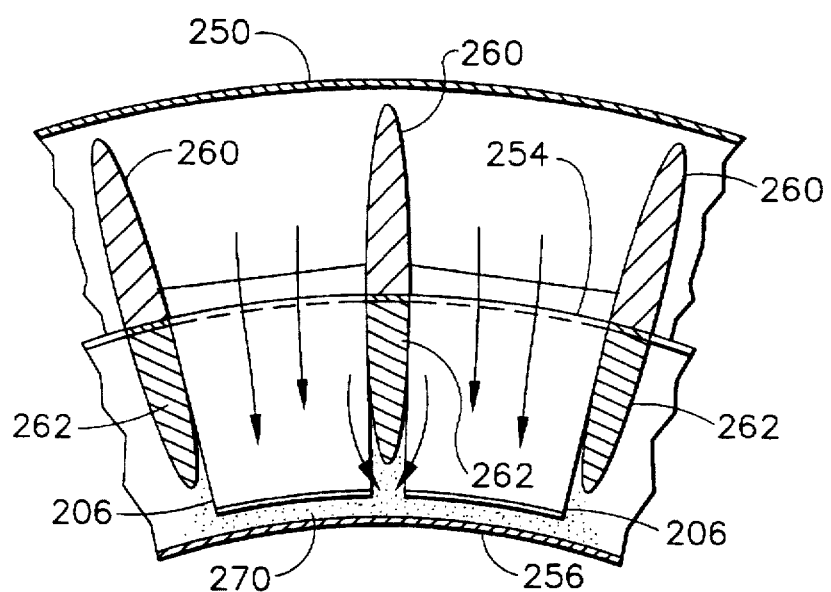
FIG. 11 is a cross-sectional view through line 11—11 in FIG. 10.

FIG. 11 is a cross-sectional view through line 11—11 in FIG. 10. As shown in FIG. 11, splitters 260 and 262 direct air flow through the respective air flow paths. Splitters 260 and 262 do not extend the full longitudinal length of the flow paths as shown in FIG. 10. This configuration allows purge air 270 to flow between the doors, e.g., doors 206.

The maximum angular orientation for doors 206 and 214 relative to shell 250 is about 45° while the maximum angular orientation for doors 208 and 216 relative to outer shell 252 portion is about 30° for good aerodynamic turning without separation and providing a short axial length for doors 206 (see FIG. 7). While in the high power modes with one or more boosters being used, the bleed doors, e.g., doors 214 and 216, can be opened outward to allow bleeds for control of each booster's operating line.

Figure 12:
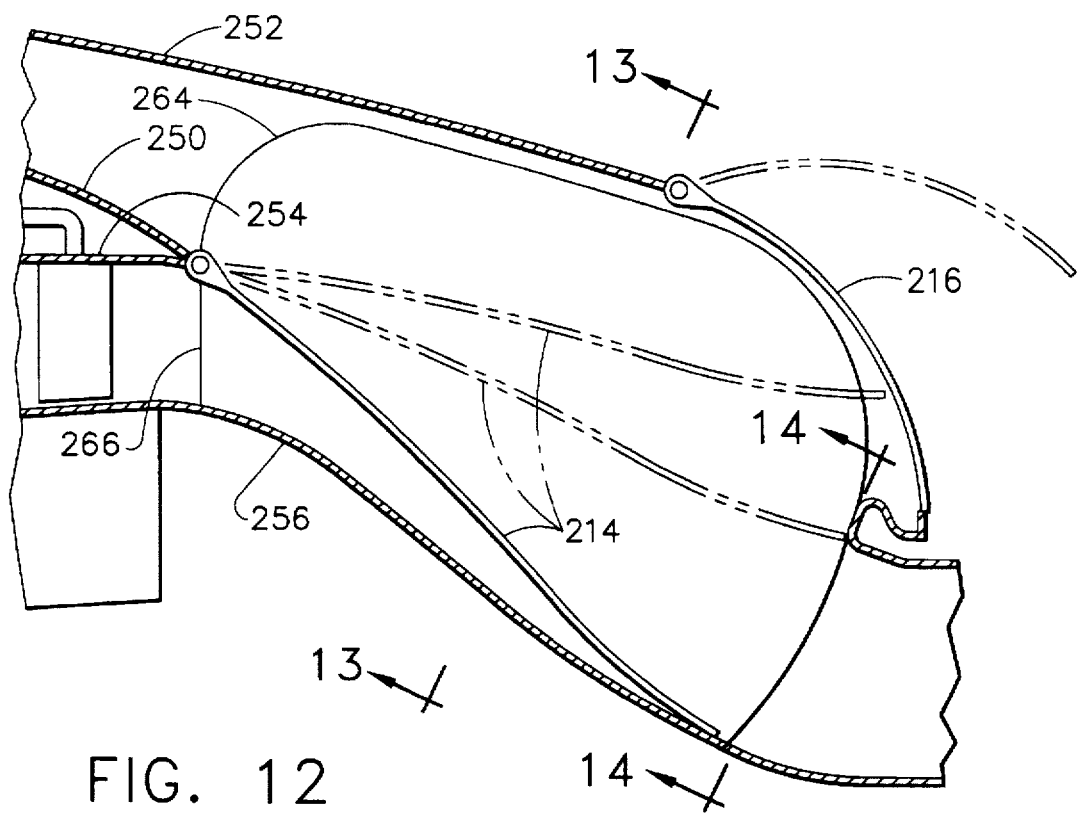
FIG. 12 is a cross-sectional view illustrating the aft set of doors used to control air flow.

FIG. 12 illustrates aft set of doors 214 and 216. Shells 250 and 254 meet at the hinge line for door 214. Thus, door 214 operates between outer shell 252 and booster bore wall 256. As shown in FIG. 12, flow splitters 264 and 266 are different from the forward splitters. Splitters 264 and 266 are circular shaped with the leading edges and trailing edges aerodynamically shaped for good flow. Doors 214 and 216 could be used on either engine 50 or engine 150.

Figure 13:
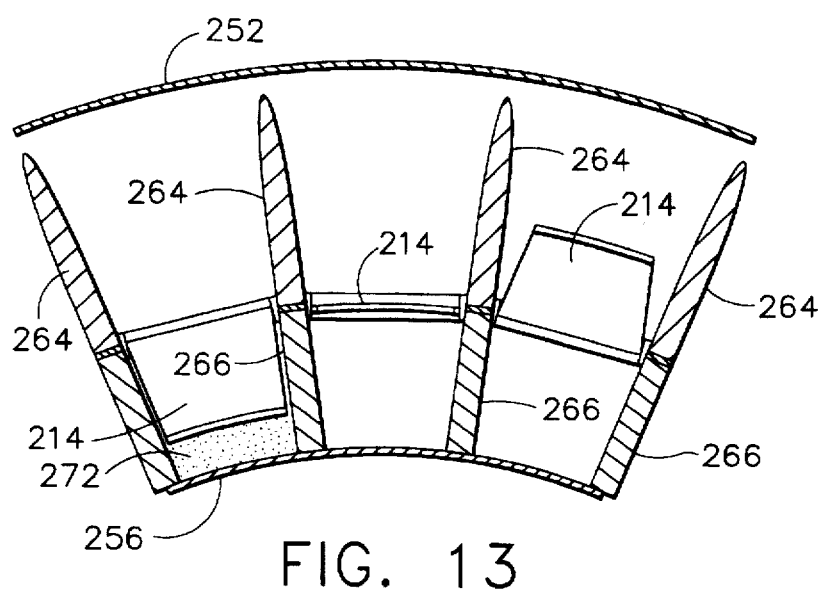
FIG. 13 is a cross-sectional view through line 13—13 in FIG. 12.

FIG. 13 illustrates three positions for door 214. The left-most door 214 is the closed position with purge air 272 leaking through. The middle door 214 is in a nominal position for full booster flow. The right-most door 214 is open to allow "bleed" flow.

Figure 14:
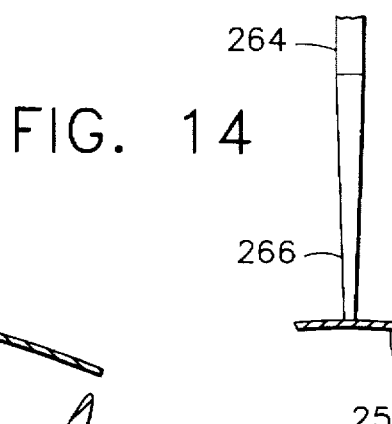
FIG. 14 is a cross-sectional view through line 14—14 in FIG. 12.

FIG. 14 is a cross sectional view through line 14—14 in FIG. 12. As shown in FIG. 14, and as described above, splitter 266 is aerodynamically shaped, e.g., tapered, so that door 214 can firmly open with respect to splitter 266 and more efficiently seal off leakage.

Engine 150 can be controlled to have operating characteristics of three different engines as explained above. Each booster stage 156A and 156B at a given power turbine speed can run a range of both airflow level and pressure ratio level. During transition from one mode to another, the VIGVs and doors move in concert, under electronic actuator control, to maintain each booster operating line to avoid stall. The VIGVs and doors must be controlled and programmed to avoid stall for a given core speed. The core engine draws its flow from an open and an opening/closing door. Both the high pressure compressor temperature distortion and pressure distortion will be the highest during a transition from one mode to another. Compressors normally can take up to a 50° F. range in temperature distortion. The pressure distortions must be minimized to reduce aeromechanical stress effects on downstream compressive blading. On core engine decelerations, the booster downstream doors must open outward to prevent booster stall.

One engine that may be modified in accordance with the present invention to provide the advantages thereof is the CF34-8C1 engine, commercially available from General Electric Company, Cincinnati, Ohio. The CF34-8C1 engine has a compressor flow of 49.5 lbs/sec.

Both engines 50 and 150 provide that advantage that the high pressure compressor can be designed for the average mission fuel burned SHP, e.g., 7500 SHP. The small high pressure compressor remains at its design point efficiencies over a wide range, e.g, 7500–31120 SHP. The high pressure compressor only retards at lower SHP, e.g., from 9600 SHP down to 773 SHP. The high pressure compressor also is small, e.g., at 40–50 lb/sec corrected airflow, and has an overall pressure ratio of around 15 or above. This high pressure ratio produces a small high pressure turbine flow function. Further, without an intercooler or a recuperator, the engine is not heavy and engine handling is much easier for maintenance.

Another significant advantage of engines 50 and 150 is that at the high SHP levels, e.g, 20000 to 31000 SHP, such engines have a good SFC for commercial use as compared to other known engines. This good SFC drives down engine operating costs. Also, with engine 50 and while in port, the small high pressure compressor and combustor could be operated as shown in FIG. 2 to provide electricity for the ship's services up to 7.2MW or there about.

More specifically, and referring to FIG. 1, unit 76 is an electric power conversion equipment module and converts d.c. to a.c. Generator 72 is coupled to power turbine 68 and generates a direct current, which is supplied to unit 76. Generator 72 operates at various speeds in the range of 3600 rpm and below and outputs power in the range of 10,051 SHP to zero to drive a.c. motor 60 for booster 56 at different speeds of 2200–3600 rpm.

When the ship is in port, with booster 56 configured as shown in FIG. 2, engine 50 can deliver about 10,200 SHP for ship services. Specifically, the d.c. from generator 72 can be converted, by unit 76, to a.c. and then used to provide ship's services at about a speed of 2180 rpm from power turbine 68. In this mode, propeller 74 (FIG. 1) would have to be uncoupled from the drive shaft or feathered.

Many variations, modifications and additions to the embodiments described above are possible. For example, for infra-red detection protection, the hot exhaust flow could be diluted by entraining ambient air in the ejector exhaust system to hold temperatures at or below 700° F. This cycle could only be recuperated at or below 9600 SHP when the compressor discharge temperature is below the power turbine discharge temperature. If a recuperator were used for low powers, the exhaust stack temperature would still require some exhaust stack ejector induced entrainment flows to reach 700° F. or lower. If a recuperator were used, it would be bypassed for high power operation above 9600 SHP. In addition, more or fewer flow paths could be established in the booster configurations described herein. The number of flow paths selected depends on the engine application.

From the preceding description of various embodiments of the present invention, it is evident that the objects of the invention are attained. Although the invention has been described and illustrated in detail, it is to be clearly understood that the same is intended by way of illustration and example only and is not to be taken by way of limitation. Accordingly, the spirit and scope of the invention are to be limited only by the terms of the appended claims.

What is claimed is:

1. A gas turbine engine comprising:
   a core engine for generating a gas flow; and
   a booster for pressurizing air, said booster comprising a low pressure compressor, a first flow path for directing air flow around said booster compressor to said core engine, and a second flow path for directing air flow at least partially through said booster compressor, to be pressurized thereby, to said core engine, at least a first control door and at least a first variable inlet guide vane for selectively controlling air flow through said first and second flow paths.

2. A gas turbine engine in accordance with claim 1 wherein said core engine comprises a high pressure compressor and a high pressure turbine rotatable on a first shaft.

3. A gas turbine engine in accordance with claim 2 wherein said booster compressor is rotatable on a second shaft.

4. A gas turbine engine in accordance with claim 3 further comprising a motor coupled to drive said second shaft.

5. A gas turbine engine in accordance with claim 4 further comprising a low pressure turbine, said low pressure turbine coupled to a third shaft, said third shaft driving an electric generator, said electric generator coupled to said motor for supplying energy thereto.

6. A gas turbine engine in accordance with claim 5 wherein said engine is positioned within a ship, the ship including ship services requiring electric power for operation, and said electric generator connected to at least partially supply power to the ship services.

7. A gas turbine engine in accordance with claim 2 further comprising a low pressure turbine, said low pressure turbine coupled to said second shaft.

8. A gas turbine engine in accordance with claim 1 further comprising a low power turbine having a plurality of variable area turbine nozzles operable to optimize SFC at low powers.

9. A gas turbine engine in accordance with claim 1 wherein said booster compressor comprises a first stage and a second stage, said first flow path directing air flow around said first and said second booster stages to said core engine, said second flow path directing air flow through said first and said second booster stages, to be pressurized thereby, to said core engine, said gas turbine engine further comprising a third air flow path for directing air flow around said first stage to said second stage of said booster to be pressurized thereby.

10. A gas turbine engine in accordance with claim 1 further comprising a shell, at least some of said control doors mounted to said shell.

11. A booster for gas turbine engine, the engine including a core engine for generating a gas flow, said booster comprising:
    a low pressure compressor;
    a first flow path for directing air flow around said low pressure compressor to said core engine;
    a second flow path for directing air flow at least partially through said low pressure compressor, to be pressurized thereby, to said core engine; and
    at least a first control door and at least a first variable inlet guide vane for selectively controlling air flow through said first and second flow paths.

12. A booster in accordance with claim 11 wherein the core engine comprises a high pressure compressor, a combustor, and a high pressure turbine rotatable on a first shaft.

13. A booster in accordance with claim 12 wherein said low pressure compressor is rotatable on a second shaft.

14. A booster in accordance with claim 13 further comprising a motor coupled to said shaft.

15. A booster in accordance with claim 14 wherein the engine further includes a low pressure turbine, the low pressure turbine coupled to a turbine shaft, said turbine shaft driving an electric generator, the electric generator coupled to said motor for supplying energy thereto.

16. A booster in accordance with claim 11 wherein said low pressure compressor comprises a first stage and a second stage, said first flow path directing air flow around said first and said second stages to the core engine, said second flow path directing air flow through said first and said second stages, to be pressurized thereby, to the core engine, said booster further comprising a third air flow path for directing air flow around said first stage to said second stage to be pressurized thereby.

17. A booster in accordance with claim 11 further comprising a shell, at least some of said control doors mounted to said shell.

* * * * *